US011858788B2

(12) United States Patent
Schneider

(10) Patent No.: US 11,858,788 B2
(45) Date of Patent: Jan. 2, 2024

(54) TELESCOPING JIB OF A MOBILE CRANE

(71) Applicant: Tadano Demag GmbH, Zweibrücken (DE)

(72) Inventor: Simon Schneider, Martinshöhe (DE)

(73) Assignee: Tadano Demag GmbH, Zweibrücken (DE)

( * ) Notice: Subject to any disclaimer, the term of this patent is extended or adjusted under 35 U.S.C. 154(b) by 0 days.

(21) Appl. No.: 17/523,063

(22) Filed: Nov. 10, 2021

(65) Prior Publication Data

US 2022/0144602 A1 May 12, 2022

(30) Foreign Application Priority Data

Nov. 11, 2020 (DE) ......................... 102020129762.9

(51) Int. Cl.
*B66C 23/70* (2006.01)

(52) U.S. Cl.
CPC ................................ *B66C 23/708* (2013.01)

(58) Field of Classification Search
CPC ....... B66C 23/04; B66C 23/26; B66C 23/305; B66C 23/42; B66C 23/66; B66C 23/68; B66C 23/70; B66C 23/701; B66C 23/702; B66C 23/708
USPC .......................................................... 212/292
See application file for complete search history.

(56) References Cited

U.S. PATENT DOCUMENTS

| | | | | |
|---|---|---|---|---|
| 5,628,416 | A * | 5/1997 | Frommelt | B66C 23/708 212/292 |
| 6,189,712 | B1 * | 2/2001 | Conrad | B66C 23/705 212/292 |
| 6,216,895 | B1 * | 4/2001 | Erdmann | B66C 23/708 212/292 |
| 11,130,659 | B2 | 9/2021 | Muller | |
| 1,167,962 | A1 | 11/2021 | Weckbecker et al. | |
| 11,174,137 | B2 | 11/2021 | Muller | |
| 2021/0139296 | A1 | 5/2021 | Heintz | |
| 2021/0179398 | A1 | 6/2021 | Urban | |
| 2021/0188601 | A1 | 6/2021 | Urban | |
| 2021/0261388 | A1 | 8/2021 | Urban | |
| 2021/0323796 | A1 | 10/2021 | Zimmer | |

FOREIGN PATENT DOCUMENTS

| | | | | |
|---|---|---|---|---|
| CN | 103303820 | A * | 9/2013 | |
| DE | 3146311 | C2 | 10/1989 | |
| DE | 19641193 | A1 * | 3/1998 | B66C 23/701 |
| DE | 19824672 | A1 * | 12/1998 | B66C 23/705 |

(Continued)

*Primary Examiner* — Michael R Mansen
*Assistant Examiner* — Henrix Soto
(74) *Attorney, Agent, or Firm* — Gardner, Linn, Burkhart & Ondersma LLP

(57) ABSTRACT

A telescoping jib of a mobile crane having a basic box and a plurality of inner boxes that can each be extended from a retraction position to an extension position and that can be locked and unlocked together in the respective retraction position or extension positions by means of bolting holes, which are arranged in the basic and inner boxes, and associated locking bolts. In order to provide a telescoping jib of a mobile crane which can be easily unlocked in an emergency, it is proposed that, in the retraction position of the basic and inner boxes, the bolting holes for the extension positions are aligned with one another.

8 Claims, 4 Drawing Sheets

(56) References Cited

FOREIGN PATENT DOCUMENTS

| | | | | | |
|---|---|---|---|---|---|
| DE | 19811813 | A1 | | 9/1999 | |
| EP | 754646 | A1 | * | 1/1997 | ........... B66C 23/708 |
| WO | WO-2007052339 | A1 | * | 5/2007 | ........... B66C 23/705 |
| WO | WO-2011107929 | A2 | * | 9/2011 | ........... B66C 23/705 |

* cited by examiner

TELESCOPING JIB OF A MOBILE CRANE

CROSS REFERENCE TO RELATED APPLICATION

The present application claims the priority benefits of German Application No. 10 2020 129 762.9, filed on Nov. 11, 2020.

BACKGROUND AND FIELD OF THE INVENTION

The invention relates to a telescoping jib of a mobile crane having a basic box and a plurality of inner boxes which can each be extended from a retraction position to an extension position and which can be locked and unlocked together in the respective retraction position or the extension positions via bolting holes arranged in the basic and inner boxes and associated locking bolts.

German laid-open document DE 198 11 813 A1 already describes a telescoping jib of a mobile crane and, in particular, a locking system for this telescoping jib. The telescoping jib typically consists of a multiplicity of telescoping boxes which are inserted one inside the other and which can be individually and successively retracted and extended by means of a telescoping device in order to change the length of the telescoping jib. The respectively adjacent telescoping boxes are secured against extension or retraction in their retraction position and in each pre-designated extension position via one or a plurality of locking bolts. These locking bolts are each arranged at a lower end of the telescoping box and on the inside except for the outermost telescoping box and protrude, in their locking position, into a bolting hole of the next outermost telescoping box in each case. Corresponding bolting holes for the retraction position and each of the pre-designated extension positions are thus located along the longitudinal direction of each telescoping box. The bolting holes are covered in each case by the telescoping boxes which adjoin one another on the outside, as the individual telescoping boxes typically have the same extension lengths over the pre-designated arrangement of the bolting holes.

In order to move a telescoping box, a securing and locking unit of the telescoping device is moved into the region of the locking bolts of the telescoping box to be moved. At this location, driving bolts arranged on the securing and locking unit are then coupled with corresponding driving openings on the telescoping box to be moved. Subsequently, the locking and securing unit moves the locking bolts of the telescoping box, which is to be moved, to their unlocking position. The telescoping box to be moved can now be pushed out from its retraction position to the desired extension position via the telescoping device by means of the securing and locking unit and then locked again in this extension position via the locking bolts. Then, the driving bolts are released and the telescoping device with the securing and locking unit is then retracted.

In the event of disruptions to the normal telescoping operation, it may be necessary to unlock locking bolts in an emergency. For this purpose, a threaded screw is provided which can be screwed in to unlock the spring-loaded locking bolt via a lever. For this purpose, bores are typically provided in the region of the bolting holes in all outwardly adjoining telescoping boxes in order to be able to screw the threaded screw in from outside the telescoping boxes.

Furthermore, a telescoping jib of a mobile crane is already known from German patent specification DE 31 46 311 C2, which consists of a base portion, two intermediate portions and an end portion. The intermediate portions can be extended and retracted via screw drives. In order also to be able to extend the end portion, a pair of stop bolts are provided in the innermost end portion, with which the end portion can also be connected to the screw drive if required. For this purpose, the stop bolts can be adjusted manually from the outside via a further screw drive using a hand crank. Since the further screw drive is arranged in the innermost end portion, the hand crank is to be inserted into the further screw drive in each case from the outside through the base portion, the two intermediate portions and the end portion. This is affected via access openings for the hand crank which are aligned for this purpose in the base portion, the two intermediate portions and the end portion.

SUMMARY OF THE INVENTION

The present invention provides a telescoping jib that can be easily unlocked in an emergency.

In accordance with an aspect of the invention, in the case of a telescoping jib of a mobile crane comprising a basic box and a plurality of inner boxes which can each be extended from a retraction position to an extension position and which can be locked and unlocked together in the respective retraction position or the extension positions via bolting holes arranged in the basic and inner boxes and associated locking bolts, a simple option for emergency-unlocking is achieved by virtue of the fact that, in the retraction position of the basic and inner boxes, the bolting holes for the extension positions are aligned with each other. Thus, the locking bolt is easily accessible from the outside for emergency-unlocking, without major manufacturing outlay for additional holes for emergency-unlocking and without weakening the inner and outer boxes by the additional holes. Also, a corresponding static design of the inner and outer boxes with the additional holes is not necessary. In accordance with the invention, the arrangement of the bolting holes one above the other is achieved by adapting the stepped extension lengths of the inner boxes to each other in such a way that the bolting holes are all located one above the other and thus all locking bolts can be reached from the outside without the need for additional holes.

In a particular embodiment, in the extension position the locking bolts can be unlocked from the outside through the bolting holes in an emergency.

In the context of the present invention, an emergency-unlocking event is understood to be conditions in which e.g. a failure to tighten the locking bolts, a failure to secure the inner box by the telescoping cylinder or a complete failure of the telescoping system occurs. The present invention simplifies the accessibility of the locking bolts from the outside and, in an emergency-unlocking event, the locking bolt can then be released in a first step so that further measures can then be taken.

From a constructional point of view in one advantageous embodiment, in the extension position a front end of the locking bolts is accessible from the outside through the bolting holes of the outwardly adjoining inner boxes. Additional holes, which mean increased manufacturing outlay and have to be statically designed, can thus be avoided. In a further advantageous embodiment, provision is made that an unlocking element accessible from the outside is arranged in the front end of the locking bolts.

The invention is explained in more detail herein with the aid of an exemplified embodiment illustrated in the drawings.

DESCRIPTION OF THE PREFERRED EMBODIMENTS

Figure 1:
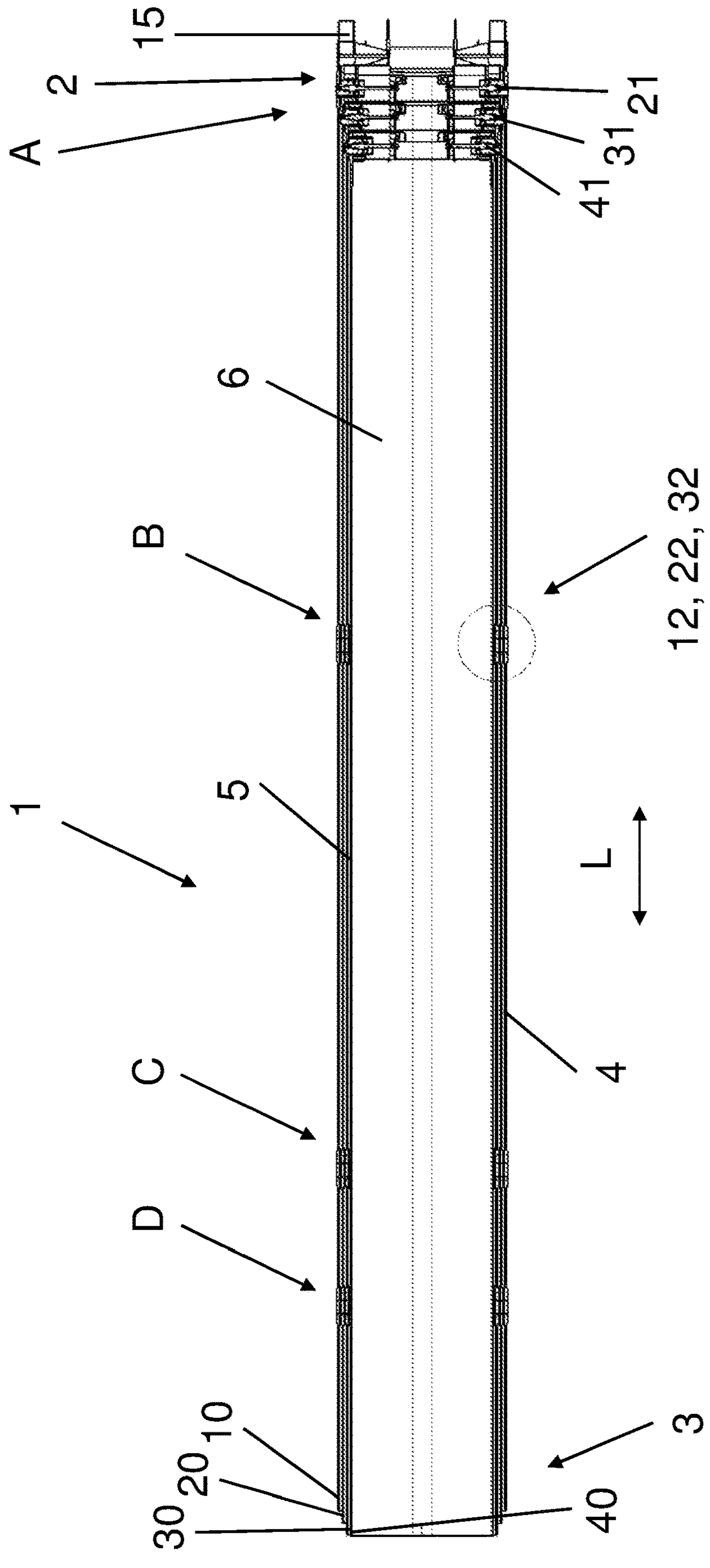
FIG. 1 shows a schematic plan view of a telescoping jib in section in accordance with an aspect of the present invention.

FIG. 1 shows a schematic plan view of an inventive telescoping jib 1 in section. The telescoping jib 1 extends with its longitudinal direction L from its foot end 2 to its head end 3 and consists substantially of an outermost basic box 10 in which a first inner box 20, a second inner box 30 and a third inner box 40 are telescopically inserted one inside the other. With a horizontally oriented telescoping jib 1, the plane of the section is approximately halfway up the telescoping jib 1 and extends centrally through its left and right side walls 4, 5. In a corresponding manner, the section also extends through bolting holes 12, 22, 32 which are typically arranged in the side walls 4, 5 and are arranged in each case along the basic box 10 and the inner boxes 20, 30, in a retraction position A, a first extension position B, a second extension position C and a third extension position D. No bolting holes are provided in the innermost third inner box 40, as the bolting of the innermost third inner box 40 takes place at the bolting holes 32 of the outwardly adjacent second inner box 30. In principle, it is conceivable that further bolt holes are also arranged on the third inner box 40 to accommodate further inner boxes, not shown.

Figure 5:
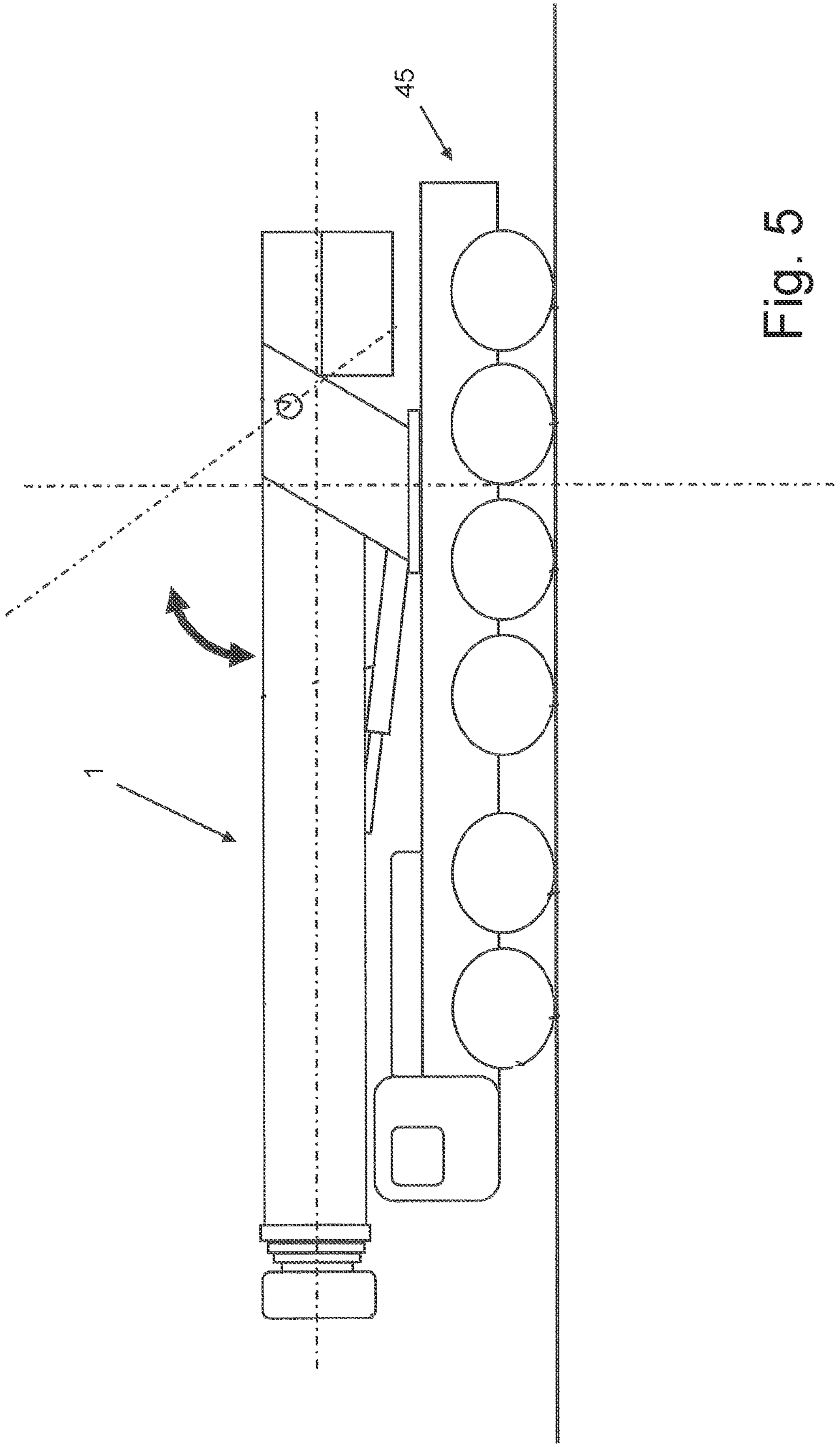
FIG. 5 shows a schematic of a mobile crane with the telescoping jib of FIG. 1.

The telescoping jib 1 is a component of a mobile crane 45 (FIG. 5), which can be moved on public roads and typically consists of a lower carriage with rubber-tired wheels and a superstructure which can be pivoted thereon about a vertical axis. The telescoping jib 1 is then articulated to the superstructure and opposite a counterweight so that it can be luffed about a horizontal axis. This articulation is affected via the foot connection 15 on the basic box 10 illustrated in FIG. 1.

Typically, in order to change the length of the telescoping jib 1, the inner boxes 20, 30, 40 are linearly retracted and extended individually and successively from the basic box 10 or the next outer inner box 20, 30 by means of a telescoping device, not illustrated for reasons of clarity. The telescoping device consists substantially of a hydraulic telescoping cylinder which is arranged centrally in the telescoping jib 1, is supported in the region of the foot connection 15 of the basic box 10, extends in the longitudinal direction L and carries a so-called securing and locking unit, not illustrated, on its extendible part, in particular on its lower end of the cylinder tube. Via the securing and locking unit, on the one hand, the telescoping cylinder can be coupled via driving bolts for the retraction and extension of the respective inner box 20, 30, 40 with recesses arranged at this location in the region of the respective foot ends 2 and, on the other hand, the inner box 20, 30, 40 which is to be retracted or extended in each case can be unlocked by moving locking bolts 21, 31, 41 respectively from a locking position to an unlocking position in each case before the retraction or extension movement and can be locked after the retraction or extension movement by moving the respective locking bolt 21, 31, 41 from its unlocking position to its locking position.

For reasons of clarity, the telescoping device, the telescoping cylinder, the securing and locking unit, the driving bolts and the recesses for the driving bolts are not shown in FIG. 1.

Figure 2:
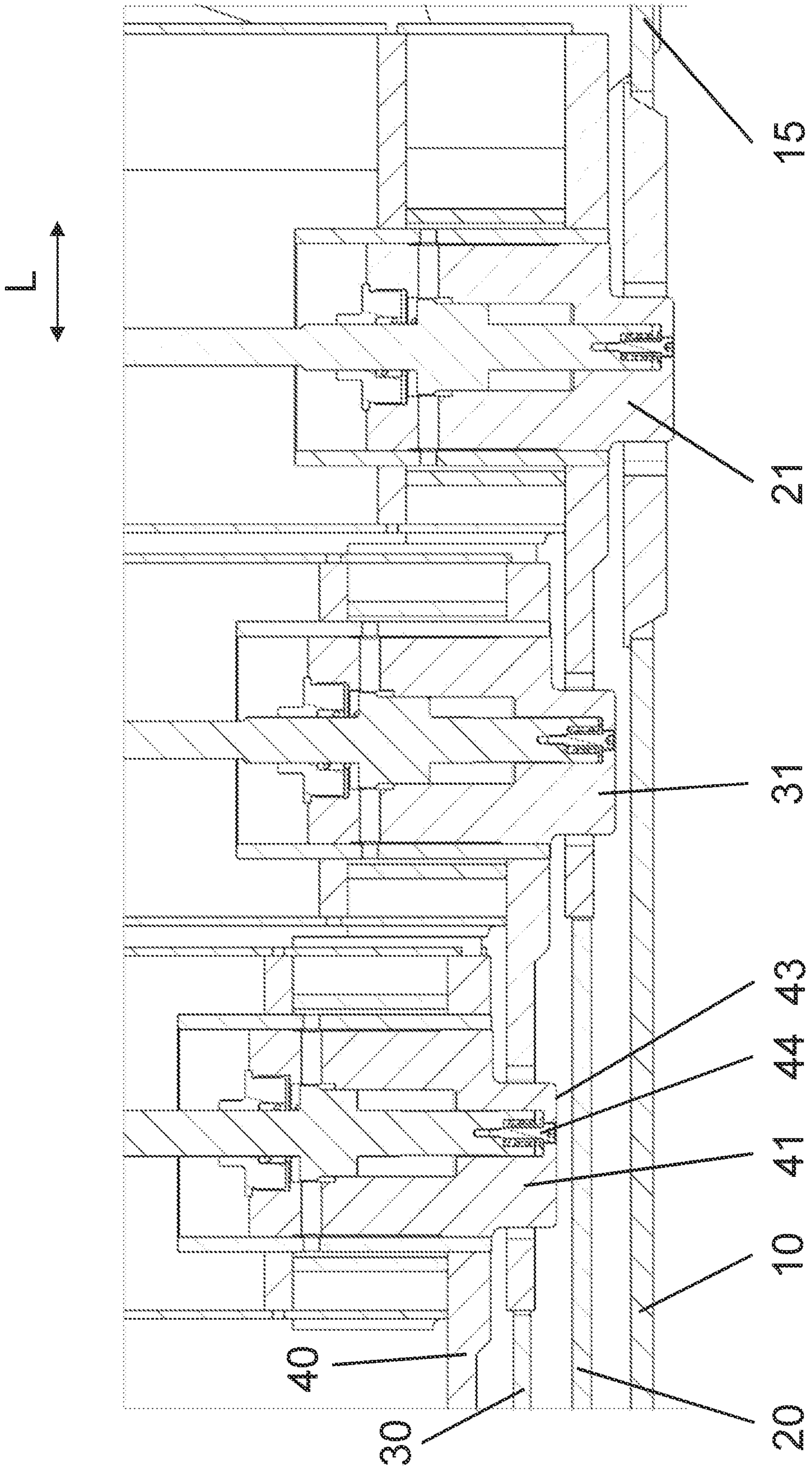
FIG. 2 shows an enlargement of a section of FIG. 1 from the region of the foot end of the telescoping jib.

In connection with the retraction and extension of the respective inner boxes 20, 30, 40, a first locking bolt 21, a second locking bolt 31 and a third locking bolt 41 are shown in FIG. 1 and also in FIG. 2, which shows an enlargement of a section of FIG. 1 from the region of the foot end 2 of the telescoping jib 1.

In a telescoping jib in accordance with the prior art, the retraction position A and the extension positions B, C and D are to be associated in each case with specific and equal extension lengths of the inner boxes, e.g. with the values of 0%, 45%, 90% and 100% extension length. Since at the foot ends of the inner boxes the locking bolts protrude inwards, the next inner box cannot be inserted completely in each case. A corresponding situation is also present in the telescoping jib 1 in accordance with the invention (see FIGS. 1 and 2). Since each of the inner boxes according to the prior art has the same extension lengths, e.g. with the values of 0%, 45%, 90% and 100%, it follows that, as in the retraction position A, the bolting holes are also arranged in an offset manner with respect to each other in the respective extension positions B, C and D in the longitudinal direction of the telescoping jib when the telescoping jib is in the completely inserted state. In this way, however, the desired equal extension lengths are achieved, regardless of which of the inner boxes is extended. By way of example, the achievable extension lengths depending on the retraction position or extension positions of the inner boxes for a telescoping jib according to the prior art are listed below in a table:

| Extension length | First inner box | Second inner box | Third inner box |
|---|---|---|---|
| 0% | 0 mm | 0 mm | 0 mm |
| 45% | 5000 mm | 5000 mm | 5000 mm |
| 90% | 10000 mm | 10000 mm | 10000 mm |
| 100% | 11425 mm | 11305 mm | 11245 mm |

Typically, the 100% extension lengths already deviate from each other even in the prior art because they are determined in such a way that the individual inner boxes have sufficient clamping length from a static point of view. However, care is not taken to ensure that the bolting holes lie one above the other, but instead that the inner boxes are utilised as effectively as possible.

In contrast, the telescoping jib 1 in accordance with the present invention provides that, when the telescoping jib 1 is in the completely inserted state, the respective bolting holes 12, 22, 32 (see FIGS. 3 and 4) are aligned with each other in the region of the first extension position B, the second extension position C and the third extension position D with respect to the longitudinal direction L of the telescoping jib 1 and the respective height in the side wall 4, 5 of the respective basic box 10 or inner box 20, 30, 40. The bolting holes 12, 22, 32 are described only by way of example at the first extension position B and, of course, can also be found at all other extension positions C, D and the retraction position A. Since the, in particular round, bolting holes 12, 22, 32 each have the same opening, in particular the same diameter, an inner space 6 of the telescoping jib 1 or of the third inner box 40 is accessible from outside the telescoping jib 1. In any case, the bolting holes 12, 22, 32 overlap at least to the extent that a pin-like tool having a diameter in the range of 5 to 20 mm can pass through them from the outside.

The inventive aligned arrangement of the bolting holes 12, 22, 32 results in different extension lengths for each of the inner boxes 20, 30, 40 in relation to the extension positions B, C, D. In other words, extension lengths of the inner boxes 20, 30, 40 have been selected so that the bolting holes 12, 22, 32 of the extension positions B, C, D are aligned with each other. These extension lengths are listed below in a table. Here the extension lengths have continued to be described as 0%, 45%, 90% and 100% as previously for better comparability with the table above, although they now hover around these percentage values.

| Extension length | First inner box | Second inner box | Third inner box |
|---|---|---|---|
| 0% | 0 mm | 0 mm | 0 mm |
| 45% | 5275 mm | 5000 mm | 4725 mm |
| 90% | 10275 mm | 10000 mm | 9725 mm |
| 100% | 11580 mm | 11305 mm | 11030 mm |

Furthermore, it can be seen in FIGS. 1 and 2 that the first locking bolt 21 is arranged internally at the foot end 2 of the first inner box 20, the second locking bolt 31 is arranged internally at the foot end 2 of the second inner box 30 and the third locking bolt 41 is arranged internally at the foot end 2 of the third inner box 40. The basic box 10 and the inner boxes 20, 30, 40 are designed as tubular bodies with a substantially rectangular cross-section and the locking bolts 21, 31, 41 are each arranged laterally—in relation to the top side or bottom side of the basic box 10 or inner box 20, 30, 40—and internally on one of the two side walls 4, 5 of the basic box 10 or inner box 20, 30, 40. Also, the locking bolts 21, 31, 41 are each movable transversely to the longitudinal direction L of the telescoping jib 1 and horizontally—in relation to a telescoping jib 1 oriented horizontally in the longitudinal direction L—from an unlocking position to a locking position by the securing and locking unit not shown. In the locking position, the respective locking bolts 21, 31, 41 connect the inner box 20, 30, 40, on which they are arranged, to the next outer inner box 20, 30 and basic box 10 respectively, in that they are moved into corresponding bolting holes 12, 22, 32. A retraction and extension movement in the longitudinal direction L of the respective basic or inner boxes 10, 20, 30, 40 is thus blocked by the respective locking bolt 21, 31, 41 in the locking position. In the unlocking position, the locking bolts 21, 31, 41 release the bolting hole 12, 22, 32 of the next outer inner box 20, 30 or basic box 10.

Figure 3:
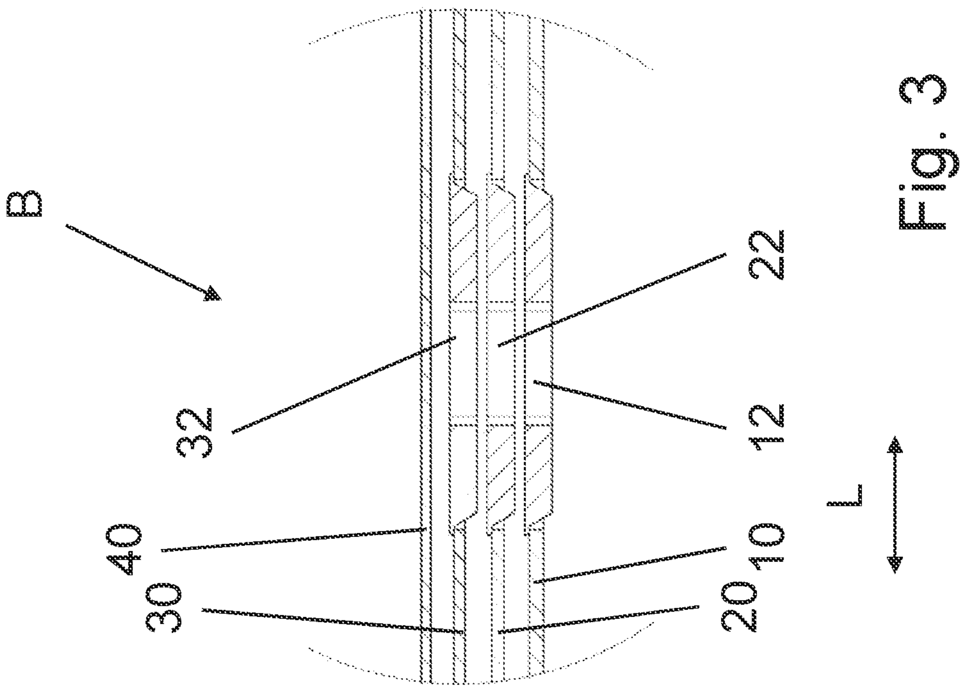
FIG. 3 shows an enlargement of a section of FIG. 1 from the region of a bolting hole.

FIG. 3 shows an enlargement of a section of FIG. 1 from the region of the first extension position B and the associated bolting holes 12, 22, 32 in the left side wall 4. As described above, the arrangement of the bolting holes 12, 22, 32 in the basic box 10 or the inner boxes 20, 30, 40 has been selected in such a way that, in the case of a telescoping jib 1 with inner boxes 20, 30, 40 inserted in retraction position A, all of the bolting holes 12, 22, 32 are aligned with each other with their central axes or, as seen from the inside, lie one above the other.

Figure 4:
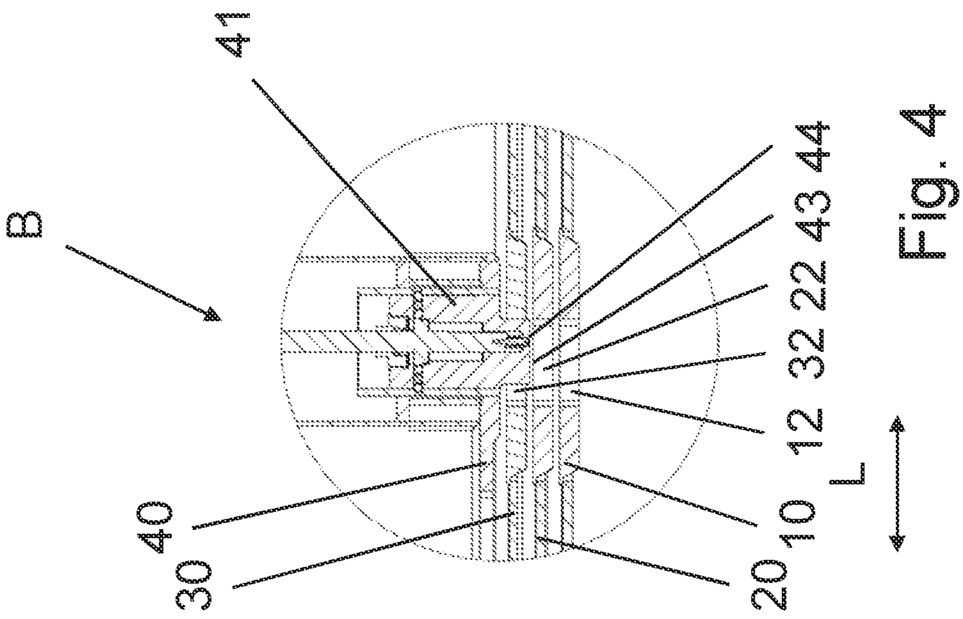
FIG. 4 shows a view according to FIG. 3 with an extended inner box and a locking bolt in the locking state.

FIG. 4 shows a view according to FIG. 3, in which the innermost third inner box 40 is extended to the first extension position B. In a corresponding manner, the third locking bolt 41 associated with the third inner box 40 is then located in the third bolting hole 32 of the adjacent second inner box 30 in the locking state and protrudes with its front or outer end into the third bolting hole 32. FIG. 4 also clearly shows that the third locking bolt 41, in particular its front end 43, is easily accessible from outside the telescoping jib 1 through the first and second bolting holes 12, 22 and can thus also be easily unlocked in an emergency, if necessary. For this purpose, the third locking bolt 41 can then have a corresponding emergency-unlocking opening or device. How exactly the locking bolts are then manually unlocked is not the subject matter of the invention; the present invention relates only to the accessibility of the front end 43 of the locking bolts from the outside.

The locking bolts 21, 31, 41 have an internal blocking mechanism, not illustrated, which holds the locking bolts 21, 31, 41 in the locking position—also referred to as the bolting position. This blocking mechanism can be unlocked by hand from the outside by pressing on an unlocking element 44 which is arranged in the front end 43 of the third locking bolt 41 and can be designed as a screw, such as a threaded screw. For this purpose, the unlocking element 44 is pressed inwards by hand. Then the third locking bolt 41 can be pushed inwards by hand to the unlocking position—also referred to as the unbolting position. The same applies to the other locking bolts 21, 31.

The above description also applies to the bolting holes in the second extension position C and the third extension position D and associated locking bolts which are not designated by reference numerals.

The above exemplified embodiment is related to a telescoping jib 1 having one basic box 10 and three inner boxes 20, 30 and 40. It is obvious to also design a telescoping jib 1 having more than 3 inner boxes 20, 30 and 40.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A telescoping jib of a mobile crane comprising:

an outermost single basic box in which a plurality of inner boxes are telescopically inserted one inside the other, wherein the plurality of inner boxes can each be extended from a retraction position to an extension position and that can be locked and unlocked together in the respective retraction position or various extension positions via bolting holes and associated locking bolts;

wherein the bolting holes are arranged in the single basic box and the inner boxes, and wherein in the retraction position of the single basic box and inner boxes the bolting holes of the single basic box and the inner boxes for all of the various extension positions are aligned with one another, wherein in the extension position the locking bolts can be unlocked from the outside through the bolting holes in an emergency, and wherein in the extension position a front end of the locking bolts is accessible from the outside through the bolting holes of the inner boxes and the basic box outwardly adjoining the inner box of the plurality of the inner boxes carrying the locking bolt.

2. The telescoping jib as claimed in claim 1, wherein an unlocking element is arranged in the front end of the locking bolts.

3. The telescoping jib as claimed in claim 1, wherein in the extension position a front end of the locking bolts is accessible from the outside through the bolting holes of the inner boxes and the basic box outwardly adjoining the inner box of the inner boxes carrying the locking bolt.

4. The telescoping jib as claimed in claim 3, wherein an unlocking element is arranged in the front end of the locking bolts.

5. A mobile crane telescoping jib of a mobile crane comprising:

a telescoping jib comprising an outermost single basic box in which a plurality of inner boxes are telescopically inserted one inside the other, wherein the plurality of inner boxes can each be extended from a retraction position to an extension position and that can be locked and unlocked together in the respective retraction position or various extension positions via bolting holes and associated locking bolts;

wherein the bolting holes are arranged in the single basic box and the inner boxes, and wherein in the retraction position of the single basic box and inner boxes the bolting holes of the single basic box and the inner boxes for all of the various extension positions are aligned with one another, wherein in the extension position the locking bolts can be unlocked from the outside through the bolting holes in an emergency, and wherein in the extension position a front end of the locking bolts is accessible from the outside through the bolting holes of the inner boxes and the basic box outwardly adjoining the inner box of the plurality of the inner boxes carrying the locking bolt.

6. The mobile crane as claimed in claim 5, wherein an unlocking element is arranged in the front end of the locking bolts.

7. The mobile crane as claimed in claim 5, wherein in the extension position a front end of the locking bolts is accessible from the outside through the bolting holes of the inner boxes and the basic box outwardly adjoining the inner box of the plurality of the inner boxes carrying the locking bolt.

8. The mobile crane as claimed in claim 7, wherein an unlocking element is arranged in the front end of the locking bolts.

* * * * *